United States Patent [19]

Brode

[11] 4,255,327

[45] Mar. 10, 1981

[54] DIRECT BLACK DYE

[75] Inventor: David A. Brode, Birdsboro, Pa.

[73] Assignee: Crompton & Knowles Corporation, New York, N.Y.

[21] Appl. No.: 24,256

[22] Filed: Mar. 27, 1979

[51] Int. Cl.³ .................. C09B 31/16; C09H 31/16
[52] U.S. Cl. ................... 260/173; 260/169
[58] Field of Search ................... 260/169, 173

[56] References Cited

U.S. PATENT DOCUMENTS

| | | | |
|---|---|---|---|
| 526,763 | 10/1894 | Weinberg | 260/169 |
| 2,018,234 | 10/1935 | Smith | 260/169 |
| 3,927,163 | 12/1975 | Papa et al. | 8/26 |
| 4,052,380 | 10/1977 | Gaetani et al. | 260/169 |

OTHER PUBLICATIONS

Venkataraman, vol. I pp. 449, 450, 575.
Colour Index, p. 4294 (C.I. Nos. 31560, 31565).
Color Index, 3rd Ed., vol. 4, p. 4314, No. 34000.

*Primary Examiner*—John F. Niebling
*Attorney, Agent, or Firm*—William H. Elliott, Jr.

[57] ABSTRACT

This invention relates to a new group of trisazo compounds that are useful as direct dyes for cellulosic textiles, paper and leather; imparting a black coloration thereto. The new dye is intended to replace the widely used paper dye known as C.I. Direct Black 38—a dye synthesized from an intermediate (benzidine) whose use is being curtailed because it is a known carcinogen.

4 Claims, No Drawings

DIRECT BLACK DYE

The compounds of this invention are water-soluble tri- or tetrasulfonic acid compounds having the structure

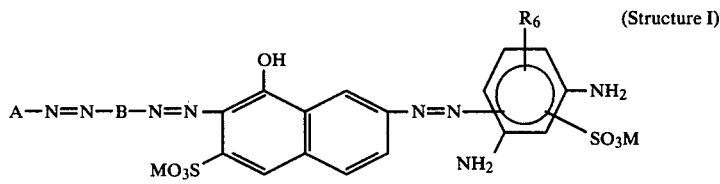

(Structure I)

where A is

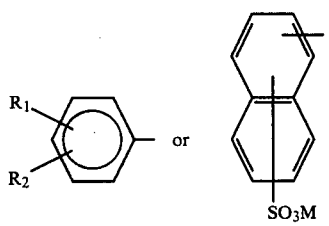

where $R_1$ is H, $SO_3M$, lower alkyl, lower alkoxy, halogen, COOM, NHCO lower alkyl, NHCOCOOM, $NO_2$ or CN and $R_2$ is H, $SO_3M$, lower alkyl, lower alkoxy, halogen or COOM;

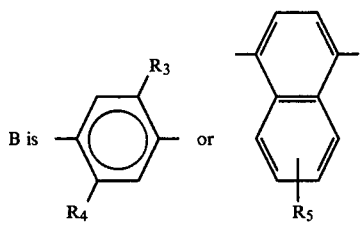

wherein $R_3$ is H, lower alkyl or lower alkoxy; $R_4$ is H, lower alkyl, lower alkoxy or NHCO lower alkyl; $R_5$ is H, or $SO_3M$; $R_6$ is H, or lower alkyl and M is H, Na, K, Li, $NH_4$ or a mono, di or trialkanol amine.

The Structure I compounds must include three or four sulfonic acid groups and are usually made as sodium sulfonate salts; but as is well known in the art, they can also be made as free acids or as the potassium, lithium, or —N—$(R_7)_4$ wherein $R_7$ represents the same substituent or different substituents selected from the following: H, —$CH_2CH_2OH$, —$CH_2CH(OH)CH_3$ or —$CHCH_2OCH_2CH_2OH$.

The compounds are made by conventional sequential diazotization and coupling reactions but using intermediates that have not heretofore been coupled in the particular sequences required to form the Structure I compounds. Thus they are made by diazotizing aniline, an aniline derivative or a naphthylamine sulfonic acid and coupling to aniline, an aniline derivative, a naphthylamine or a naphthylamine sulfonic acid using conventional coupling techniques (including sulfomethylation of the coupler N atom and, after coupling, hydrolysis of this activating group, where necessary); rediazotizing the resulting monoazo compound and coupling to Gamma acid in alkaline medium; rediazotizing the resulting disazo compound and coupling to m-phenylenediamine sulfonic acid (or lower alkyl homologs thereof) preferably in a slightly acid medium.

Suitable aniline diazo components for providing the A component of the Structure I compounds are those having the structure

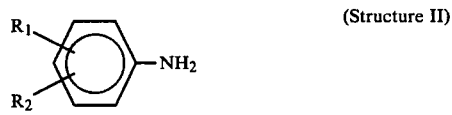

(Structure II)

wherein $R_1$ is H, $SO_3M$, lower alkyl, lower alkoxy, halogen (preferably Cl), COOM, NHCO lower alkyl (particularly $NHCOCH_3$), NHCOCOOM (particularly NHCOCOOH), $NO_2$ or CN and $R_2$ is H, $SO_3M$, lower alkyl, lower alkoxy, and COOM (particularly COOH). The preferred A component diazos are derived from aniline, the aminobenzene sulfonic acids, toluidine, anisidine, the chloroanilines, and especially p-aminoacetanilide and its sulfonated derivative.

Naphthylamine sulfonic acids having the structure (Structure III)

can also be used as diazo components to provide the A component of Structure I compounds. Especially useful are Broenner's acid, Cleves 1,6 acid, Cleves 1,7 acid, mixed Cleves acid (1,6 and 1,7), Tobias acid, Laurent's acid, and Naphthionic acid.

Preferred couplers for providing the B component of the Structure I compounds are aniline derivatives having the structure:

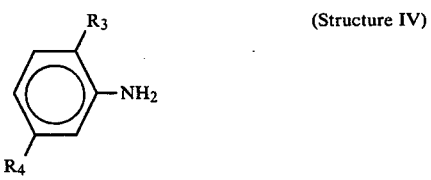

(Structure IV)

(wherein $R_3$ is H, or lower alkyl or lower alkoxy and $R_4$ is H, lower alkyl, lower alkoxy or NHCO lower alkyl) and a naphthylamine having the structure:

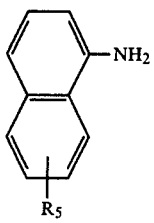

(Structure V)

wherein $R_5$ is H or $SO_3M$.

The amino monoazo compound resulting from the coupling to the Structure IV or V coupler can be rediazotized by conventional techniques; and the resulting diazonium salt coupled to Gamma acid in an alkaline medium—usually a pH of 8–9. The resulting amino disazo compound is rediazotized and coupled to m-phenylene diamine sulfonic acid or a lower alkyl ($C_1$ to $C_4$) homolog thereof to form the Structure I compounds.

When using 1-naphthylamine as the coupler in the first coupling reaction, suitable precautions must be observed in the storing and handling of the intermediate and one must otherwise comply with Federal rules and regulations with respect thereto.

The Structure I compounds are especially useful as black dyes for paper and they can be employed as direct dyes for cellulosic textiles and as leather dyes. They possess outstanding water solubility. They do not exhibit pronounced shade shifts over the usual pH range encountered in the paper industry as is characteristic of C.I. Direct Black 38. They are readily bleachable with the usual bleaching agents employed by paper makers, thus permitting recycling of waste and cuttings. Their normal working properties are substantially the same as conventional blacks for paper. Moreover, and as previously noted, the Structure I compounds are not synthesized from benzidine. The wet and light fastness properties of dyeings made with the Structure I compounds on cellulosic textiles are equal to C.I. Direct Black 38.

All Structure I compounds have stability and solubility characteristics that enable their use in the beater dyeing process for making paper wherein fiber and water are mixed and violently agitated in a hydropulper and after a uniform pulp has been formed, chemicals such as rosin size, talc, clay, $TiO_2$ and the dyes are added to the pulp. Part of the dye exhausts onto the fiber and the remainder is forced onto the fiber by the addition of an electrolyte such as aluminum sulfate. This dry development process is frequently carried out in a very cold environment with pulp temperatures close to 0° C.; the Structure I compounds have sufficient cold water solubility so that they dissolve in the cold pulp mix.

The following examples will serve to illustrate the preparation and use of the Structure I compounds. In these examples, unless otherwise indicated, parts are by weight, temperatures are given in degrees Centigrade and percentages are by weight.

EXAMPLE 1

To a mixture of 45.0 parts of p-amino-acetanilide, 150 parts of water, 87 parts of 20° Bé hydrochloric acid and 150 parts of ice, was added over 15 minutes 21.0 parts of $NaNO_2$ in 42 parts of water, holding the temperature 5–10° C. After stirring for 30 minutes, the excess nitrous acid was removed with sulfamic acid, 100 parts of ice and 2.0 parts of filter-aid was added, and the diazo solution was clarified.

The diazo solution was added in 30 minutes to a slurry of 66.9 parts of 1-naphthylamine-6-sulfonic acid (Cleves 1,6 acid) 80 parts of $Na_2CO_3$ and 220 parts of water previously cooled to 50° C. with 150 parts of ice. The coupling was stirred at a pH of 7.0–8.0 for one hour until spot tests no longer indicated the presence of diazo.

The coupling was acidified with 232 parts of 20° Bé hydrochloric acid as rapidly as foaming permitted, cooled to 10°–15° C. with 50 parts of ice and rediazotized by the addition of 21.0 parts of $NaNO_2$ dissolved in 42 parts of water over one hour. After stirring for 2 hours the excess nitrous acid was removed with sulfamic acid.

The rediazo slurry was added to a solution of 71.7 parts of 2-amino-8-naphthol-6-sulfonic acid (Gamma acid) in 300 parts of water plus 80 parts of $Na_2CO_3$, previously cooled to 5° C. with 100 parts of ice, over 30 minutes, stopping the addition at the halfway point to add 30 parts of additional $Na_2CO_3$ to maintain a pH of 8.0–9.0. After stirring the coupling for 18 hours, it was warmed to 50° C., NaCl was added equivalent to 5 percent of the volume, the mass stirred for one hour at 50° C. and then filtered on a Buchner funnel.

The press cake so obtained was reslurried in 1400 parts of water, rapidly acidified with 140 parts of 20° Bé hydrochloric acid, and rediazotized by adding 19.0 parts of $NaNO_2$ dissolved in 38 parts of water, over 30 minutes. After stirring for one hour, the excess nitrous acid was removed with sulfamic acid, and a solution of 56.4 parts of m-phenylenediamine sulfonic acid in 300 parts of water plus sufficient 50 percent NaOH to raise the pH to 7.0–10.0, was rapidly added. Following this addition, 34.0 parts of $Na_2CO_3$ was added to raise the pH to 5.0–5.5, and the coupling was stirred for 18 hours. The mass was then warmed to 50° C., NaCl was added equivalent to 5 percent of the volume, the mass stirred for one hour at 50° C., and filtered on a Buchner funnel. The dyestuff so obtained had the structure

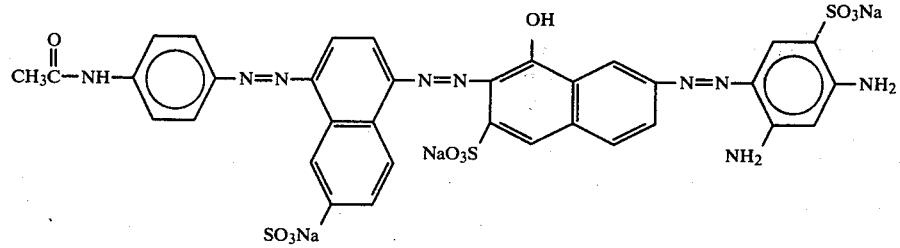

and is a highly water soluble black powder (50 g/l at 195° F.) exhibiting excellent dyeing properties on paper, leather and cellulosic fibers. It has sufficient cold water solubility to enable its use in the beater dyeing process for fine paper. When applied to cellulosic fibers from an aqueous dye bath the dye exhibits good solubility, good build and excellent reserve as compared to C.I. Direct Black 38.

Other trisazo Structure I compounds formed by the following sequence:

were prepared using the following intermediates for the A, B and E components:

| Example No. | Intermediate for A | Intermediate for B | Intermediate for E |
|---|---|---|---|
| 2 | N-acetyl-p-phenylene diamine sulfonic acid | Cleves 1,7 acid | m-phenylene diamine sulfonic acid |
| 3 | o-toluidine | Cleves 1,6 acid | m-phenylene diamine sulfonic acid |
| 4 | o-anisidine | Cleves 1,6 acid | m-phenylene diamine sulfonic acid |
| 5 | o-anisidine | Cleves 1,6 acid | m-toluene diamine sulfonic acid |
| 6 | o-chloraniline | Mixed Cleves 1,6 + 1,7 acids | m-phenylene diamine sulfonic acid |
| 7 | Broenner's acid | Cleves 1,6 | M-phenylene diamine sulfonic acid |
| 8 | Broenner's acid | p-cresidine | m-phenylene diamine sulfonic acid |
| 9 | metanilic acid | o-anisidine | m-phenylene diamine sulfonic acid |
|  | (coupled as the omega sulfonate and subjected to hydrolysis before rediazotization) | | |
| 10 | metanilic acid | 1-naphthylamine | m-phenylene diamine sulfonic acid |
| 11 | n-acetyl-p-phenylene diamine sulfonic acid | 1-naphthylamine | m-phenylene diamine sulfonic acid |

EXAMPLE 12

To 250 parts of water at 70° F. add 5.0 parts of Bleached Softwood Kraft paper pulp (Brightness of 88-91 photovolt, freeness of 425-450 ml CSF) and 2.0 parts of a 2.5 percent solution in water of rosin size, and mix for five minutes with a paddle stirrer. Add the appropriate amount of a dye according to Example 1 (as a 0.25 percent solution in water) to obtain the desired depth of shade and mix for 20 minutes. Adjust the pH of the slurry to 4.5 with alum, mix for 5 minutes and form a handsheet, adjusting the pH of the water in the sheet mould to 4.5 with alum. Press the hand sheet between 2 blotters at 500 psi., transfer to 2 clean, dry blotters, and dry on a drum dryer at a surface temperature of 210°-215° F.

The resulting shade was 4-5 blue versus a comparable application of C.I. Direct Black 38. The pH stability was superior, exhibiting minimal shade change with increasing pH whereas the Direct Black 38 shows a marked "green" shift.

EXAMPLE 13

To 50 parts of water at 120° F., add 2 parts of a 5 percent solution of Sodium-N-methyl-N-oleoyl taurate, the appropriate amount of the dye of Example 1 (as a 0.2 percent solution) to obtain the desired depth of shade, and 20 parts of a 20 percent solution of NaCl. Add sufficient water at 120° F. to make 200 parts of liquor, transfer the liquor to a standard Launderometer can and add a 10 part swatch of prewetted rayon. Place the can in a Launderometer and bring to a boil at a rate of 2° F. per minute. Hold the bath at the boil for one hour, then remove the can and allow the bath to cool. Remove the dyed fabric, rinse it in a 0.5 percent NaCl solution, extract the fabric in a centrifugal (Bock) extractor and dry at 180° F. The dyeing so obtained was redder than the C.I. Direct Black 38 and built to jet black shades. The wet and light fastness properties were comparable to those obtained with C.I. Direct Black 38.

I claim:

1. A tri or tetrasulfonic compound having the structure

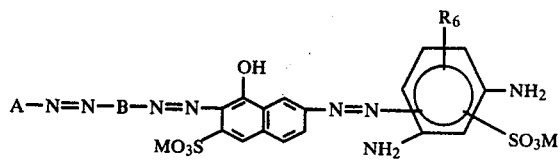

where A is

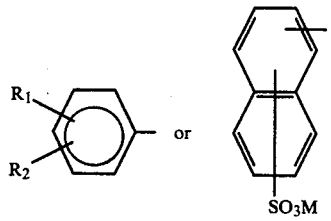

where $R_1$ is H, $SO_3M$, lower alkyl, lower alkoxy, halogen, COOM, NHCO lower alkyl, NHCOCOOM, $NO_2$ or CN and $R_2$ is H, $SO_3M$, lower alkyl, lower alkoxy, halogen or COOM;

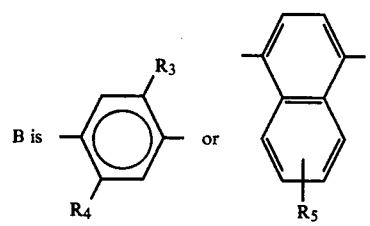

wherein $R_3$ is H, lower alkyl or lower alkoxy; $R_4$ is H, lower alkyl, lower alkoxy or NHCO lower alkyl; $R_5$ is H or $SO_3M$; $R_6$ is H or lower alkyl and M is H, Na, K, Li, $NH_4$ or a mono, di or tri alkanol amine.

2. The method of making a compound of claim 1 which comprises diazotizing an optionally substituted aminobenzene having the structure

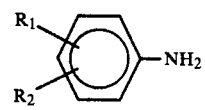

or a naphthylamine having the structure

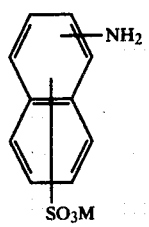

and coupling to an optionally substituted aniline, having the structure

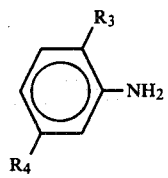

or a naphthyl amine having the structure

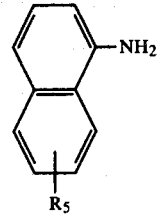

rediazotizing the resulting monoazo compound and coupling to Gamma acid in alkaline medium; rediazotizing the resulting disazo compound and coupling to m-phenylenediamime sulfonic acid or a lower alkyl homolog thereof.

3. The compound according to claim 1 having the structure:

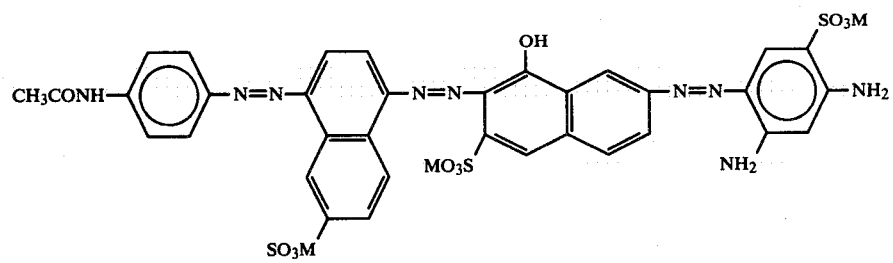

4. A compound according to claim 1 where M is Na.

* * * * *